A. LARROWE.
Carriage-Brake.
No. 21,569.
Patented Sept. 21, 1858.
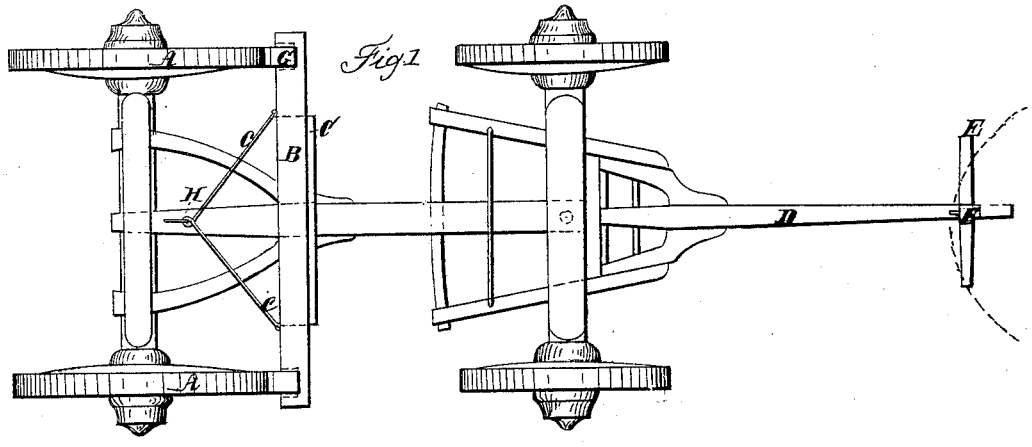
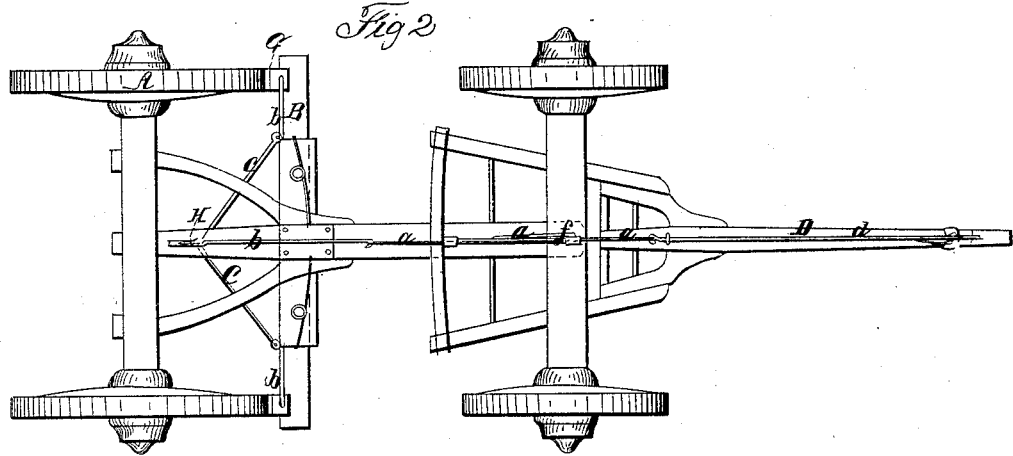
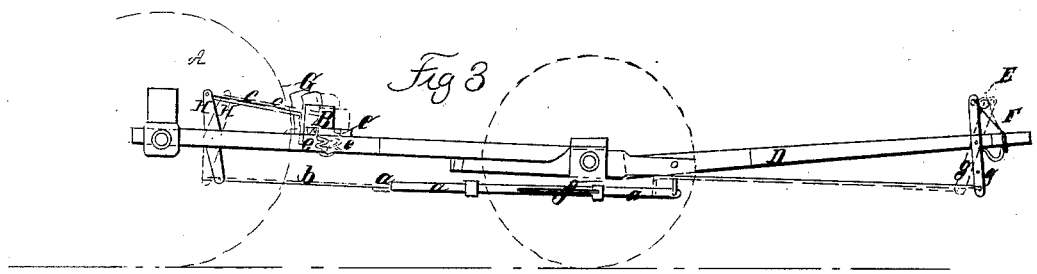

UNITED STATES PATENT OFFICE.

A. LARROWE, OF COHOCTON, NEW YORK.

SELF-ACTING WAGON-BRAKE.

Specification of Letters Patent No. 21,569, dated September 21, 1858.

*To all whom it may concern:*

Be it known that I, ALBERTUS LARROWE, of Cohocton, county of Steuben, and State of New York, have invented certain new and useful Improvements in Brakes for Wagons, Coaches, &c.; and I do hereby declare that the following is a full and exact description thereof, reference being had to the accompanying drawings and to the letters of reference marked thereon.

To enable others skilled in the art to make and use my invention, I will describe its construction and operation.

In the drawings Figure 1, is a top plan view. Fig. 2, is a bottom plan view. Fig. 3, is a side elevation.

In the construction of my invention, in Fig. 1, A, the hind wheels. B, the brake bar. C, a cross piece on which bar B rests, and is guided by the spring which passes over each end of it into the brake bar as the bar moves forward or backward. D, the guide pole. E, the neck yoke. F, the strap of yoke. G, the rubbers. On the front side of these rubbers is a piece of metal which extends on each side of the rubber and which operates in a groove in the bar B, and is to prevent the rubbers from falling out of place. H, the rear lever. (c) rods extending from the lever H to the brake bar, the lower ends of which pass below piece C, and is also a guide to it in giving direction to the movement of the brake bar.

In Fig. 2, A the wheels. B the brake bar. C, the crosspiece on which said bar rests and on which it slides to the front and rear. D, the guide pole. G, the rubbers—(h) the springs attached to the rubbers. H, the rear lever—(a) the rod for operating the brake, extending from lever F in front, to lever H in the rear of the wagon. This rod at (a) is allowed to lap passing through clips (f) through which it slides; one of the clips (f) has a spring (f') on the end of which is a pin and is let into a hole through rods (a) (a) for the purpose of lengthening or shortening the rod as may be required. (b) the rear end of the rod. (e) the coiled spring attached to the reach pole and extending beyond the cross piece C, and firmly attached to brake bar B for the purpose of removing the brake from the wheels, and allowing it to raise up; and in combination with cross piece C and rods (c) to give it always a parallel motion when pressed backward or forward.

In Fig. 3, similar characters refer to like parts. The red lines show the position of the brake when not in use; the other part of this figure shows the brake applied to the wheels. The dotted lines show the rubbers raised up to relieve the wheels in backing the wagon while the brake is still applied.

In the operation of my invention it will be seen that, when the brake is not in use, the coiled spring (e) throws it forward out of the way of the wheels as seen in red lines in Fig. 3. When in this position the upper ends of levers (g) and H stand forward above the fulcrum which is at the pin passing through the tongue and reach pole. When the team is made to back, the breast yoke is drawn against lever (g) drawing it back, which operating on the rod causes the lever H to operate on the rods (c) which draw the brake bar B back with the rubber against the wheels, and as the wheels press against the rubbers, they are pressed down firmly on the cross bar, and by means of the shoulders on the rubbers fit on to the brake bar, and is perfectly solid, and cannot be pressed below the shoulder. The piece of metal attached to the rubber is wider than the rubber and works in a groove in bar B on each side of the rubber. This prevents the rubber from slipping out of its place in the bar. The springs which are attached to the lower side of the bar and the lower ends of the rubbers for the purpose of drawing the rubbers down in proper position. It will be seen that, when the brake is applied, the wagon going forward is firmly locked; but if I wish to back the wagon although the brake is still applied, yet as the rubbers are loose in the bar B, as the wheels revolve the reverse way, the rubbers are lifted up and the pressure on the wheels is relieved, and as soon as the wagon moves forward, the springs h draw the rubber down to their proper place, thus allowing the wagon to back while the brake is applied to the wheels. The joint in the rod (d) is so arranged in its position that the wagon in turning finds no obstruction in doing so.

My invention can be applied to the front wheels simply by reversing the brake and placing it under the hounds attached to the back side of the forewheels. I can attach my brake to a buggy by placing a rod and lever to each shaft and connecting them to a cross bar under the bar uniting the shafts and thus attaching the rod (*a*) (*a*) to the center of said rod—when its operation will be the same as at present applied.

I am aware that self acting brakes having a wedge shaped rubber for self tightening on the forward motion of the wagon, and self releasing on the backward motion, are not new, such therefore I do not claim, but What I do claim as new and desire to secure by Letters Patent, is:

The constructing the rubbers with the flanges on each side operating loosely in grooves in bar B, and resting on springs (*h*) for allowing the rubber to raise up on an inclined plane and relieve the friction of the wheels when backing the wagon, and for replacing the rubbers, the whole operating as described and for the purposes set forth.

ALBERTUS LARROWE.

Witnesses:
ROBERT STEWART,
J. C. CLAYTON.